United States Patent
Choi

(10) Patent No.: US 10,563,684 B2
(45) Date of Patent: Feb. 18, 2020

(54) BED FRAME WITH BACKREST

(71) Applicant: Inno-Sports Co., Ltd., Xiamen (CN)

(72) Inventor: Kwan Jun Choi, Xiamen (CN)

(73) Assignee: Inno-Sports Co., LTD., Xiamen (CN)

( * ) Notice: Subject to any disclaimer, the term of this patent is extended or adjusted under 35 U.S.C. 154(b) by 214 days.

(21) Appl. No.: 15/820,848

(22) Filed: Nov. 22, 2017

(65) Prior Publication Data

US 2018/0332975 A1 Nov. 22, 2018

(30) Foreign Application Priority Data

May 17, 2017 (CN) .................... 2017 2 0545892 U

(51) Int. Cl.
| | |
|---|---|
| F16B 12/56 | (2006.01) |
| F16B 12/54 | (2006.01) |
| F16B 12/38 | (2006.01) |
| F16C 11/04 | (2006.01) |
| A47C 19/12 | (2006.01) |
| A47C 20/02 | (2006.01) |
| A47C 19/02 | (2006.01) |

(52) U.S. Cl.
CPC ............. *F16B 12/56* (2013.01); *F16B 12/38* (2013.01); *F16B 12/54* (2013.01); *F16C 11/04* (2013.01); *A47C 19/022* (2013.01); *A47C 19/12* (2013.01); *A47C 19/122* (2013.01); *A47C 20/027* (2013.01); *F16C 2314/70* (2013.01)

(58) Field of Classification Search
CPC .......... F16B 12/54; F16B 12/38; F16B 12/56; F16B 12/10; F16C 11/04; F16C 2314/70; Y10T 403/57
See application file for complete search history.

(56) References Cited

U.S. PATENT DOCUMENTS

| | | | |
|---|---|---|---|
| 190,338 | A | 5/1877 | Hall |
| 261,770 | A | 7/1882 | Segar |
| 478,761 | A | 7/1892 | Rodecap |
| 605,126 | A | 6/1898 | Odell |
| 767,680 | A | 8/1904 | Barton |
| 802,390 | A | 10/1905 | Gusdorf |
| 1,070,525 | A | 8/1913 | Pieper |
| 1,196,253 | A | 8/1916 | Lowy |
| 1,218,868 | A | 3/1917 | Jones |

(Continued)

OTHER PUBLICATIONS

U.S. Appl. No. 15/144,575, filed May 2, 2016.

(Continued)

*Primary Examiner* — Robert G Santos
*Assistant Examiner* — Adam C Ortiz
(74) *Attorney, Agent, or Firm* — Morgan, Lewis & Bockius LLP

(57) ABSTRACT

A bed frame includes a backrest, a bedstead and a plurality of connectors to couple the backrest with the bedstead. A connector includes first, second, third and fourth segments, in which each of the second, third, and fourth segments extends from a lower side of the first segment. A first slot is formed between the second and third segments to accommodate a bar of the backrest, and a second slot is formed between the third and fourth segments to accommodate a bar of the bedstead. When the bed frame is assembled, each connector in the plurality of connectors is fixedly coupled with the bar of the backrest, and snap-fitted on the bar of the bedstead.

20 Claims, 4 Drawing Sheets

(56) References Cited

U.S. PATENT DOCUMENTS

| | | | |
|---|---|---|---|
| 1,259,825 A | 3/1918 | Basile | |
| 1,360,983 A | 11/1920 | Charles Burton | |
| 1,367,173 A | 2/1921 | Felix | |
| 1,530,726 A | 3/1925 | Frederick Koenigkramer | |
| 1,574,659 A | 2/1926 | Johnston Sylvan Us K | |
| 2,513,168 A | 6/1950 | Edward Gottlieb | |
| 2,651,787 A | 9/1953 | James Piliero | |
| 2,671,229 A | 3/1954 | Racine Vernier | |
| 2,678,085 A | 5/1954 | De Minno | |
| 2,701,603 A | 2/1955 | Coopersmith | |
| 2,782,075 A | 2/1957 | Roscoe Fagan | |
| 2,888,688 A | 6/1959 | Worling Bereman John | |
| 3,108,291 A | 10/1963 | Eason | |
| 3,245,363 A | 4/1966 | Kanitz | |
| 3,295,149 A | 1/1967 | Joseph Hall William | |
| 3,967,330 A | 7/1976 | Zawadowsky | |
| 4,048,683 A | 9/1977 | Chen | |
| 4,594,743 A | 6/1986 | Owen | |
| 4,620,336 A | 11/1986 | Miller | |
| 4,654,905 A | 4/1987 | Miller | |
| 5,517,744 A | 5/1996 | Moser | |
| 5,608,930 A | 3/1997 | Chen | |
| 5,894,614 A | 4/1999 | Stroud | |
| 6,151,730 A | 11/2000 | Weston | |
| 6,230,344 B1 | 5/2001 | Thompson | |
| 6,643,900 B2 * | 11/2003 | Jahrling | A47B 55/02 24/336 |
| 7,376,989 B2 | 5/2008 | Wickstrom | |
| 7,406,727 B2 | 8/2008 | Wickstrom | |
| 7,503,086 B2 | 3/2009 | Wickstrom | |
| 8,312,576 B1 | 11/2012 | Oh | |
| 8,370,973 B1 | 2/2013 | Oh | |
| 8,707,478 B2 | 4/2014 | Jin | |
| 8,769,740 B2 | 7/2014 | Oh | |
| 8,898,832 B2 | 12/2014 | Oh | |
| 8,978,176 B1 | 3/2015 | Oh | |
| 9,027,181 B1 | 5/2015 | Yu | |
| 9,226,590 B1 | 1/2016 | Hull et al. | |
| 9,314,386 B1 | 4/2016 | Boyd | |
| 9,456,699 B1 | 10/2016 | Oh | |
| 9,526,347 B2 | 12/2016 | Boyd | |
| 9,538,850 B2 | 1/2017 | Oh | |
| 9,907,405 B2 | 3/2018 | An | |
| 10,034,551 B2 | 7/2018 | Hull | |
| 10,123,629 B2 | 11/2018 | Choi | |
| 10,285,506 B2 | 5/2019 | Choi | |
| 2003/0039506 A1 * | 2/2003 | Chen | F16C 11/10 403/96 |
| 2005/0251911 A1 | 11/2005 | Wickstrom | |
| 2006/0195982 A1 | 9/2006 | Cloer | |
| 2006/0230532 A1 | 10/2006 | Wickstrom | |
| 2008/0000024 A1 | 1/2008 | Peixin | |
| 2009/0133191 A1 | 5/2009 | Harrow | |
| 2009/0293193 A1 | 12/2009 | Neatherry | |
| 2010/0115696 A1 | 5/2010 | Felix, Jr. | |
| 2010/0235989 A1 | 9/2010 | Jin | |
| 2010/0299831 A1 | 12/2010 | Lee | |
| 2011/0073723 A1 | 3/2011 | Ashpole | |
| 2011/0099712 A1 | 5/2011 | Jin | |
| 2012/0042449 A1 | 2/2012 | Hull | |
| 2012/0222216 A1 | 9/2012 | Jin | |
| 2012/0246826 A1 | 10/2012 | Jin | |
| 2013/0067659 A1 | 3/2013 | Oh | |
| 2013/0067862 A1 | 3/2013 | Oh | |
| 2013/0276229 A1 | 10/2013 | Hsieh | |
| 2014/0345044 A1 | 11/2014 | Murphy | |
| 2015/0143630 A1 | 5/2015 | Harrow | |
| 2015/0320225 A1 | 11/2015 | Boyd | |
| 2016/0143447 A1 | 5/2016 | Oh | |
| 2016/0206112 A1 | 7/2016 | Oh | |
| 2016/0262547 A1 | 9/2016 | Jin | |
| 2016/0281770 A1 * | 9/2016 | Vankoughnett | B63B 35/34 |
| 2016/0302582 A1 | 10/2016 | Oh | |
| 2016/0302583 A1 | 10/2016 | Oh | |
| 2016/0316922 A1 | 11/2016 | Choi | |
| 2017/0119166 A1 | 5/2017 | An | |
| 2017/0325592 A1 | 11/2017 | Suh | |
| 2018/0116412 A1 | 5/2018 | Jin | |
| 2019/0045938 A1 | 2/2019 | Skaggs | |

OTHER PUBLICATIONS

U.S. Appl. No. 15/144,471, filed May 2, 2016.
U.S. Appl. No. 15/056,150, filed Nov. Feb. 29, 2016.
U.S. Appl. No. 15/820,754, filed Nov. 22, 2017.
U.S. Appl. No. 15/423,251, filed Feb. 2, 2017.
U.S. Appl. No. 15/640,810, filed Jul. 3, 2017.
U.S. Appl. No. 15/663,522, filed Jul. 28, 2017.
U.S. Appl. No. 15/809,161, filed Nov. 10, 2017.

* cited by examiner

US 10,563,684 B2

BED FRAME WITH BACKREST

CROSS-REFERENCE TO RELATED APPLICATIONS

The present application claims priority to Chinese Utility Model Application CN 201720545892.2 filed May 17, 2017. The disclosure of the application is incorporated herein for all purposes by reference in its entirety.

FIELD OF THE INVENTION

The present invention generally relates to bed frames and their components. More particularly, the present invention relates to bed frames with bedsteads and backrests, and connectors to couple backrests with bedsteads.

BACKGROUND

Bed is a necessity of daily life. People spend at least one fourth of their time on bed. In addition to sleeping, people often watch TVs and read books on bed. Sometimes, people even work on bed. Whether one can comfortably work, watch TV or read on bed has become a significant consideration when people buying beds. To meet these needs, a backrest has become a critical part of a bed. However, backrests of existing beds are fixed with bedsteads. Installation and disassembling of such beds are troublesome, time-consuming, labor-intensive, and thus inconvenient for users.

Given the current state of the art, there remains a need for connectors and bed frames that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides connectors and bed frames that are easy to assemble and disassemble, and stable in use.

In various exemplary embodiments, the present invention provides a connector including first, second, third and fourth segments. Each of the second, third, and fourth segments extends from a lower side of the first segment and having a free end portion. A first slot is formed between the second and third segments to accommodate a first bar. A second slot is formed between the third and fourth segments to accommodate a second bar. The second segment includes a first lug extending from a first side of the second segment. The third segment includes a second lug extending from a first side of the third segment. The free end portion of the fourth segment includes a protrusion protruding toward the third segment or an interior of the second slot to hold the second bar when the second bar is received in the second slot. At least one of the first and second lugs is formed with a through hole to allow a fastener to pass through and to fixedly couple the connector with the first bar.

In some exemplary embodiments, each of the first and second lugs is formed with a through hole to allow a fastener to pass through and to fixedly couple the connector with the first bar. In an exemplary embodiment, the through holes of the first and second lugs are aligned with each other to allow a fastener to pass through and to fixedly couple the connector with the first bar.

In some exemplary embodiments, the connector couples a backrest with a bedstead, in which the first bar is a side bar of the backrest, and the second bar is a side bar of the bedstead.

In an exemplary embodiment, the third segment includes a third lug extending from the first side of the third segment and formed with a third through hole aligned with the second through hole of the second lug.

In many exemplary embodiments, the first, second, third and fourth segments are integrally formed with each other by injection molding. In some exemplary embodiments, the second or fourth segment is elastic with respect to the first segment.

In an exemplary embodiment, the free end portion of the third segment is sloped away from the fourth segment.

In various exemplary embodiments, the present invention provides a backrest assembly including a backrest with a first bar, and a plurality of connectors disposed apart along a width direction of the backrest. Each connector in the plurality of connectors includes first, second, third and fourth segments. Each of the second, third, and fourth segments extends from a lower side of the first segment and having a free end portion first slot is formed between the second and third segments to accommodate the first bar of the backrest. A second slot is formed between the third and fourth segments to accommodate a second bar of a bedstead. The second segment includes a first lug extending from a first side of the second segment. The third segment includes a second lug extending from a first side of the third segment. At least one of the first and second lugs is formed with a through hole. The free end portion of the fourth segment includes a protrusion toward an interior of the second slot to hold the second bar when the second bar is received in the second slot. Each respective connector is fixedly coupled with the first bar of the backrest by a fastener through the through hole of the respective connector.

In some exemplary embodiments, the backrest assembly further includes a plurality of connecting bars disposed apart along the width direction of the backrest and fixedly coupled with the backrest. A free end portion of each connecting bar in the plurality of connecting bars is to be removably coupled with a corresponding coupler of the bedstead. In an exemplary embodiment, each respective connector in the plurality of connectors has a corresponding connecting bar in the plurality of connecting bars, and the corresponding connecting bar is disposed below the respective connector. In some exemplary embodiments, the plurality of connectors includes two, three, four or more connectors.

In various exemplary embodiments, the present invention provides a bed frame including a backrest, a bedstead and a plurality of connectors to couple the backrest with the bedstead. The backrest includes a first bar and the bedstead includes a second bar. Each connector in the plurality of connectors includes first, second, third and fourth segments. Each of the second, third, and fourth segments extends from a lower side of the first segment and having a free end portion. A first slot is formed between the second and third segments to accommodate the first bar of the backrest. A second slot is formed between the third and fourth segments to accommodate the second bar of the bedstead. The second segment includes a first lug extending from a first side of the second segment. The third segment includes a second lug extending from a first side of the third segment. At least one of the first and second lugs is formed with a through hole. The free end portion of the fourth segment includes a protrusion toward an interior of the second slot to hold the second bar when the second bar is received in the second slot. When the bed frame is assembled, the first bar of the backrest and the second bar of the bedstead are disposed side-by-side with each other, the plurality of connectors is spaced apart along a width direction of the backrest, each respective connector in the plurality of connectors is fixedly coupled with the first bar of the backrest by a fastener through the through hole, and each respective connector in the plurality of connectors is snap-fitted on the second bar of the bedstead through the third and fourth segments of the respective connector.

In some exemplary embodiments, of the respective connector, each of the first and second lugs is formed with a through hole to allow a fastener to pass through and to fixedly couple the respective connector with the first bar of the backrest. In an exemplary embodiment, the through holes of the first and second lugs are aligned with each other to allow a fastener to pass through and to fixedly couple the respective connector with the first bar of the backrest.

In some exemplary embodiments, the bedstead is foldable.

In many exemplary embodiments, the bedstead further includes a lower support disposed below the second bar, and a plurality of couplers formed or fixedly coupled with the lower support. The bed frame further includes a plurality of connecting bars disposed apart along the width direction of the backrest and fixedly coupled with the backrest. A free end portion of each respective connecting bar in the plurality of connecting bars is coupled with a corresponding coupler in the plurality of couplers when the bed frame is assembled. In some exemplary embodiments, the corresponding coupler includes an opening for insertion of the free end portion of the respective connecting bar. In an exemplary embodiment, the lower support has a substantially "⊏" shape.

In some exemplary embodiments, each respective connector in the plurality of connectors has a corresponding connecting bar in the plurality of connecting bars, and the corresponding connecting bar is disposed below the respective connector.

The connectors and bed frames of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

DETAILED DESCRIPTION

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of bed frames having bedsteads and backrests, and connectors coupling backrests with bedsteads. In general, a connector of the present invention includes first, second, third and fourth segments. Second, third and fourth segments extend from a side of the first segment and form two slots, each to accommodate a bar. As used herein, the term "bar" refers to a generally rigid piece of wood, metal or similar material, including but not limited to a bar, a rod, a stick, a beam, a pole or the like.

The connector of the present invention can be used to couple two objects each with a bar. For example, the connector of the present invention can be used in a bed frame to couple a backrest with a bedstead. The bed frame can be foldable (e.g., the bedstead including two or more pivotally connected sub-frames) or non-foldable. The bed frame can also be of various sizes including but not limited to twin, full, queen and king sizes, and of various shapes including but not limited to rectangles and squares. Further, the bedstead and the backrest can be made of various materials including but not limited to metals such as steel, plastics and woods.

Figure 1:
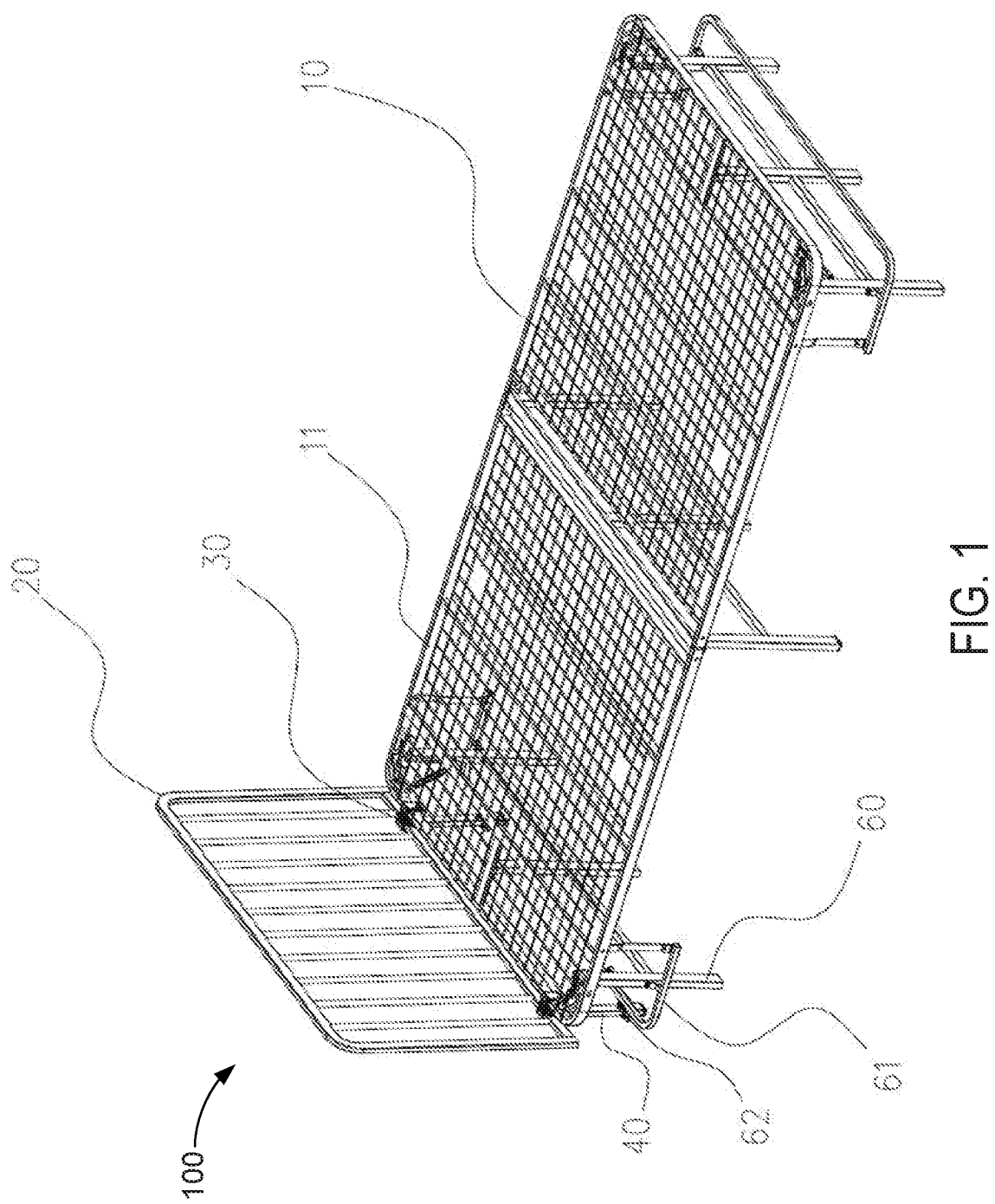
FIG. 1 is a perspective view illustrating an assembled bed frame in accordance with exemplary embodiments of the present invention.
Figure 2:
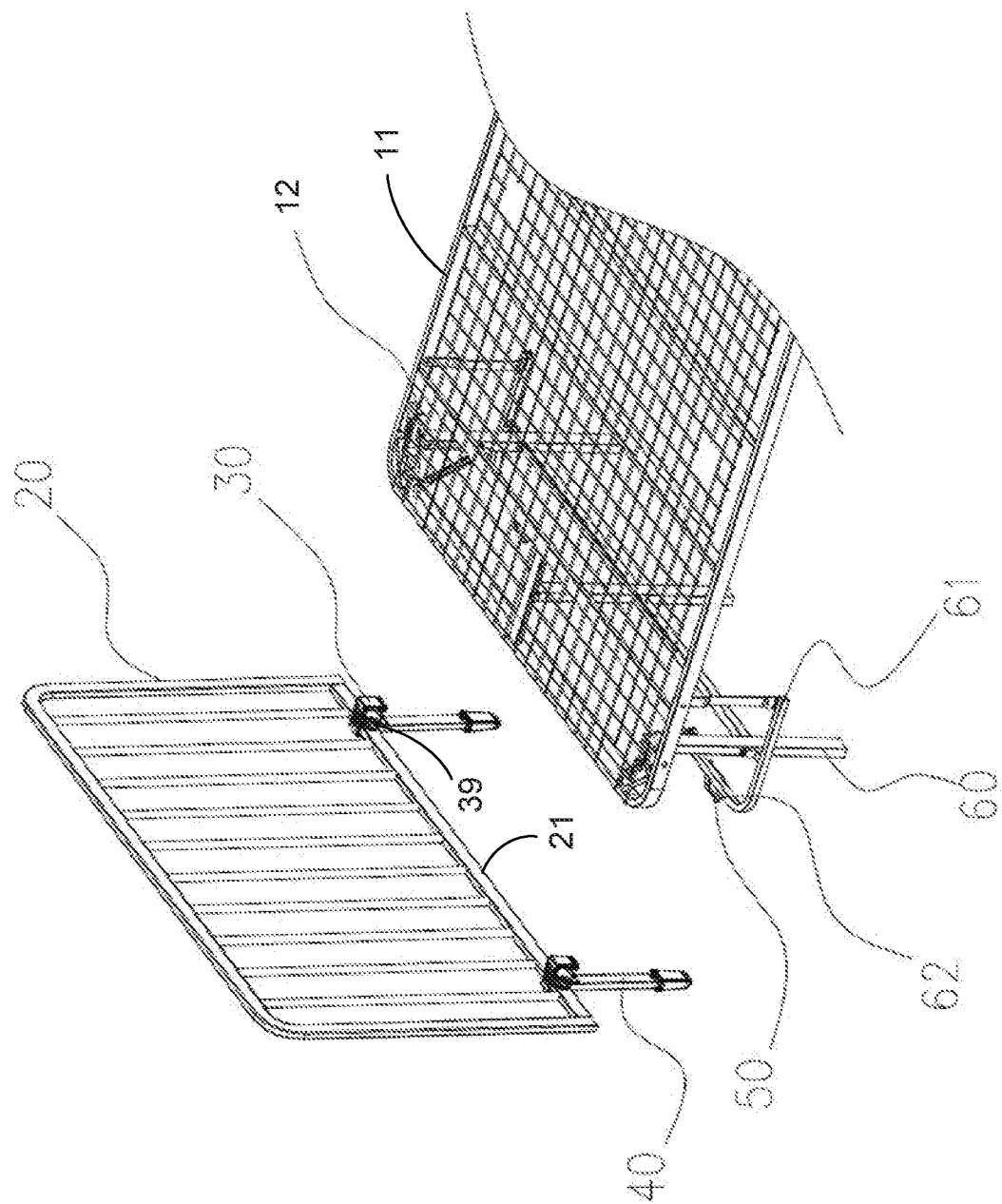
FIG. 2 is a partially disassembled view illustrating the bed frame of FIG. 1.

Referring now to FIGS. 1 and 2, there is depicted an exemplary bed frame in accordance with some embodiments of the present invention. As shown, bed frame 100 includes bedstead 10, backrest 20 and a plurality of connectors 30 coupling the backrest with the bedstead.

Backrest 20 includes a bar such as first bar 21. In some embodiments, first bar 21 is a lower portion of the peripheral frame of the backrest. Bedstead 10 includes a bar such as second bar 12. In some embodiments, second bar 12 is a portion of peripheral frame 11 at the head or foot side of the bed frame. Bedstead 10 can be foldable or non-foldable. By way of example, FIG. 1 illustrates a foldable bedstead with two sub-frames pivotally connected to each other. It should be noted that a foldable bedstead can include more than two sub-frames and can be foldable in more than one direction (e.g., longitudinal or lateral direction of the bed frame).

The plurality of connectors 30 is configured to couple backrest 20 with bedstead 10. When assembled, the plurality of connectors 30 is generally spaced apart along a width direction of the backrest. Depending on the application (e.g., the size of the bed frame), personal preference or the like, a bed frame can include two, three, four or more connectors. By way of example, FIG. 1 illustrates two connectors spaced apart along the width direction of the backrest.

Figure 3:
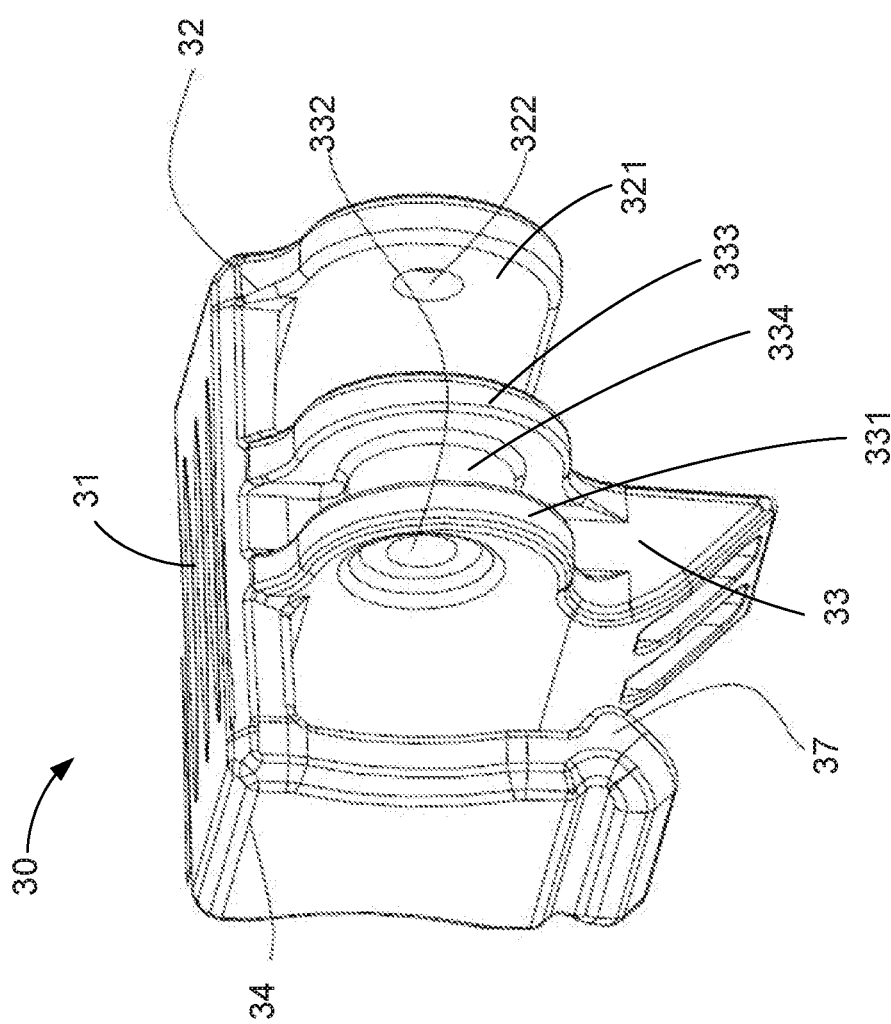
FIG. 3 is a perspective view illustrating a connector in accordance with exemplary embodiments of the present invention.
Figure 4:
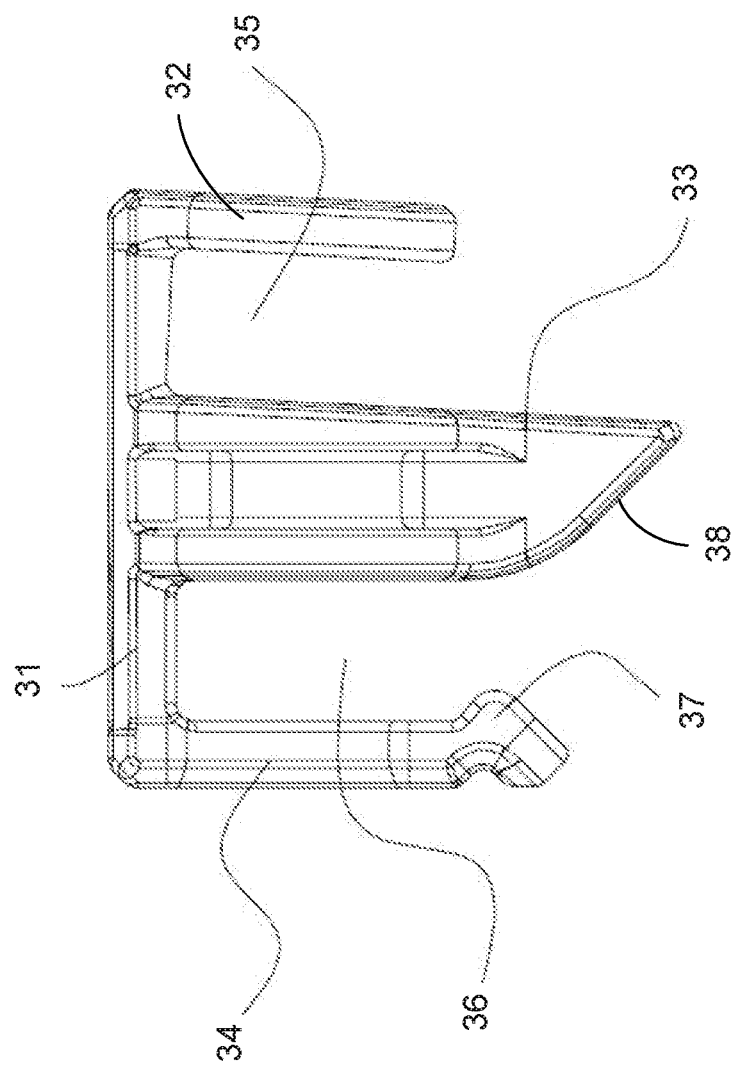
FIG. 4 is a side view illustrating the connector of FIG. 3.

Referring to FIGS. 3 and 4, in various embodiment, connector 30 includes first, second, third and fourth segments such as first segment 31, second segment 32, third segment 33 and fourth segment 34. Each of second segment 32, third segment 33 and fourth segment 34 extends from a side of first segment 31 (e.g., the lower side of the first segment in FIG. 4), and each has a free end portion (e.g., the lower end portion in FIG. 4). In some embodiments, the first, second, third, and fourth segments of the connector are integrally formed, for instance, by injection molding of a plastic. The fourth segment and the portion of the first segment between the third and fourth segments collectively form a substantially "L"-shaped clip or the like, while the second and third segments and the portion of the first segment in-between collectively form a body of the collector.

In various embodiments, a first slot such as first slot 35 is formed between the second and third segments to accommodate a first bar. Also, each of the second and third segments includes a lug extending from one side of the second or third segment. For instance, FIG. 3 illustrates second segment 32 with first lug 321 extending from a first side (e.g., the front side in FIG. 3) of second segment 32, and third segment 33 with second lug 332 extending from a first side of third segment 33.

In many embodiments, one of the first and second lugs is formed with a through hole to allow a fastener, such as a bolt, a screw or the like, to pass through and thus to fixedly couple the connector with the first bar. In some embodiments, each of the first and second lugs is formed with a through hole, and each through hole allows a fastener to pass through and thus to fixedly couple the connector with the first bar. In an embodiment, each of the first and second lugs is formed with a through hole, and the through holes of the first and second lugs are aligned with each other to allow a fastener to pass through and thus to fixedly couple the connector with the first bar. By way of example, FIG. 3 illustrates first lug 321 formed with first through hole 322, and third segment 33 formed with second through hole 332.

The second and third segments can include more than one lug extending from the side. For instance, in some embodiments, third segment 33 includes an additional lug such as third lug 333. Third lug 333 extends from the same side of the third segment as second lug 331. In an embodiment, third lug 333 is formed with third through hole 334 to allow a fastener to pass through and thus to fixedly couple the connector with the first bar.

In an embodiment, the second segment of the connector is configured to be elastic with respect to the first segment so that it is easy to place the first bar in the first slot formed between the second and third segments.

In various embodiments, a second slot such as second slot 36 is formed between the third and fourth segments to accommodate a second bar. In some embodiments, the fourth segment of the connector is configured to be elastic with respect to the first segment so that it is easy to place the second bar in the second slot formed between the third and fourth segments. In an embodiment, free end portion 38 of third segment 33 is sloped away from the fourth segment to further facilitate the coupling of the connector with the second bar.

In some embodiments, the free end portion of fourth segment 34 includes a protrusion such as protrusion 37 protruding toward third segment 33 or an interior of second slot 36. When a bar is received in the second slot, protrusion 37, together with the first, third and fourth segments, holds the bar in position.

Referring back to FIGS. 1 and 2, in some embodiments, to couple the backrest with the bedstead, each connector 30 is disposed on first bar 21 of the backrest such that first bar 21 of the backrest is received in first slot 35 of the connector. Connector 30 is then fastened on first bar 21 of the backrest by a fastener (e.g., a bolt, a screw, or the like) through the through hole(s) formed at the first and/or second lugs. To couple the backrest with the bedstead, snap-fit each connector on second bar 12 of the bedstead so that second bar 12 of the bedstead is received in second slot 36 of each connector 30 and held by the third segment and the substantially "L"-shaped clip of each connector.

In some embodiments, the bed frame further includes a plurality of connecting bars 40 disposed apart along the width direction of the backrest. Each of the connecting bars is fixedly coupled with the backrest. In an embodiment, each connecting bar has an end portion (e.g., the upper end portion in FIG. 2) fixedly coupled with first bar 21 of the backrest. The free end portion (e.g., the lower end portion in FIG. 2) of each connecting bar is configured to couple or removably couple with the bedstead when the bed frame is assembled.

To facilitate the coupling of the free end portion of each connecting bar, in some embodiments, the bedstead includes lower support 61 disposed below second bar 12. In an embodiment, lower support 61 has a substantially "⊏" shape, and is pivotally connected with peripheral frame 11 and/or leg 60 of the bedstead. The bedstead also includes a plurality of couplers 62 formed or fixedly coupled with lower support 60. Coupler 62 is configured to couple with the free end portion of connecting bar 40. For instance, in an embodiment, coupler 62 includes an opening 50 (e.g., a ring, a loop, a socket, or the like) for insertion of the free end portion of connecting bar 40.

It should be noted that the number of the connecting bars can be the same as or different from the number of connectors. It should also be noted that the connecting bars and the connectors can be distributed at the same or different positions along the width direction of the backrest. By way of example, FIGS. 1 and 2 illustrate two connectors and two connecting bars, with each connecting bar disposed below a connector.

With the connectors and/or the connecting bars of the present invention, the backrest is firmly coupled with the bedstead, making the bed frame stable and safe to use. Moreover, with the connectors and/or the connecting bars fixed at the backrest, coupling/decoupling the backrest and the bedstead is easy, simple and convenient. For instance, the backrest can be coupled with the bedstead by inserting the connecting bars into the openings of the couplers and snap-fitting the connectors with the second bar of the bedstead. Disengaging the connectors from the second bar of the bedstead and removing the connecting bars from the couplers will decouple the backrest from the bedstead. In some cases, the backrest with the connectors and/or the connecting bars is referred to as a backrest assembly.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "upper" or "lower", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first segment could be termed a second segment, and, similarly, a second segment could be termed a first segment, without changing the meaning of the description, so long as all occurrences of the "first segment" are renamed consistently and all occurrences of the "second segment" are renamed consistently.

What is claimed is:

1. A connector comprising:
 a first segment; and
 second, third and fourth segments, each extending from a lower side of the first segment and having a free end portion, wherein:
  a first slot is formed between the second and third segments to accommodate a first bar;
  a second slot is formed between the third and fourth segments to accommodate a second bar;
  the second segment comprises a first lug extending from a first side thereof;
  the third segment comprises a second lug extending from a first side thereof; and
  the free end portion of the fourth segment comprises a protrusion protruding toward the third segment or an interior of the second slot to hold the second bar when the second bar is received in the second slot;
 wherein at least one of the first and second lugs is formed with a through hole to allow a fastener to pass through and to fixedly couple the connector with the first bar.

2. The connector of claim 1, wherein each of the first and second lugs is formed with a through hole to allow a fastener to pass through and to fixedly couple the connector with the first bar.

3. The connector of claim 1, wherein each of the first and second lugs is formed with a through hole, and the through holes of the first and second lugs are aligned with each other to allow a fastener to pass through and to fixedly couple the connector with the first bar.

4. The connector of claim 1, wherein the connector couples a backrest with a bedstead, wherein the first bar is a side bar of the backrest, and the second bar is a side bar of the bedstead.

5. The connector of claim 1, wherein the third segment comprises a third lug extending from the first side thereof and formed with a third through hole aligned with the second through hole of the second lug.

6. The connector of claim 1, wherein the first, second, third and fourth segments are integrally formed with each other by injection molding.

7. The connector of claim 1, wherein the second or fourth segment is elastic with respect to the first segment.

8. The connector of claim 1, wherein the free end portion of the third segment is sloped away from the fourth segment.

9. A backrest assembly comprising:
 a backrest comprising a first bar; and
 a plurality of connectors disposed apart along a width direction of the backrest, each connector in the plurality of connectors comprising first, second, third and fourth segments, wherein:
  each of the second, third and fourth segments extends from a lower side of the first segment and having a free end portion;
  a first slot is formed between the second and third segments to accommodate the first bar of the backrest;
  a second slot is formed between the third and fourth segments to accommodate a second bar of a bedstead;
  the second segment comprises a first lug extending from a first side thereof;
  the third segment comprises a second lug extending from a first side thereof;
  at least one of the first and second lugs is formed with a through hole; and
  the free end portion of the fourth segment comprises a protrusion toward an interior of the second slot to hold the second bar when the second bar is received in the second slot;
 wherein each respective connector is fixedly coupled with the first bar of the backrest by a fastener through the through hole of the respective connector.

10. The backrest assembly of claim 9, further comprising:
 a plurality of connecting bars disposed apart along the width direction of the backrest and fixedly coupled with the backrest, wherein a free end portion of each connecting bar in the plurality of connecting bars is to be removably coupled with a corresponding coupler of the bedstead.

11. The backrest assembly of claim 10, wherein each respective connector in the plurality of connectors has a corresponding connecting bar in the plurality of connecting bars, wherein the corresponding connecting bar is disposed below the respective connector.

12. The backrest assembly of claim 10, wherein the plurality of connectors comprises two, three, four or more connectors.

13. A bed frame comprising:
 a backrest comprising a first bar;
 a bedstead comprising a second bar; and
 a plurality of connectors, each comprising first, second, third and fourth segments, wherein:
  each of the second, third and fourth segments extends from a lower side of the first segment and having a free end portion;
  a first slot is formed between the second and third segments to accommodate the first bar of the backrest;
  a second slot is formed between the third and fourth segments to accommodate the second bar of the bedstead;
  the second segment comprises a first lug extending from a first side thereof;
  the third segment comprises a second lug extending from a first side thereof;
  at least one of the first and second lugs is formed with a through hole; and
  the free end portion of the fourth segment comprises a protrusion toward an interior of the second slot to hold the second bar when the second bar is received in the second slot;
 wherein when the bed frame is assembled:

the first bar of the backrest and the second bar of the bedstead are disposed side-by-side with each other;

the plurality of connectors is spaced apart along a width direction of the backrest;

each respective connector in the plurality of connectors is fixedly coupled with the first bar of the backrest by a fastener through the through hole thereof; and each respective connector in the plurality of connectors is snap-fitted on the second bar of the bedstead through the third and fourth segments thereof.

14. The bed frame of claim 13, wherein of the respective connector, each of the first and second lugs is formed with a through hole to allow a fastener to pass through and to fixedly couple the respective connector with the first bar of the backrest.

15. The bed frame of claim 13, wherein of the respective connector, each of the first and second lugs is formed with a through hole, and the through holes of the first and second lugs are aligned with each other to allow a fastener to pass through and to fixedly couple the respective connector with the first bar of the backrest.

16. The bed frame of claim 13, wherein the bedstead is foldable.

17. The bed frame of claim 13, wherein the bedstead further comprises a lower support disposed below the second bar, and a plurality of couplers formed or fixedly coupled with the lower support, the bed frame further comprising:

a plurality of connecting bars disposed apart along the width direction of the backrest and fixedly coupled with the backrest, wherein a free end portion of each respective connecting bar in the plurality of connecting bars is coupled with a corresponding coupler in the plurality of couplers when the bed frame is assembled.

18. The bed frame of claim 17, wherein the lower support has a substantially "⊏" shape.

19. The bed frame of claim 17, wherein the corresponding coupler comprises an opening for insertion of the free end portion of the respective connecting bar.

20. The bed frame of claim 13, wherein each respective connector in the plurality of connectors has a corresponding connecting bar in the plurality of connecting bars, wherein the corresponding connecting bar is disposed below the respective connector.

\* \* \* \* \*